United States Patent Office 3,706,033
Patented Dec. 12, 1972

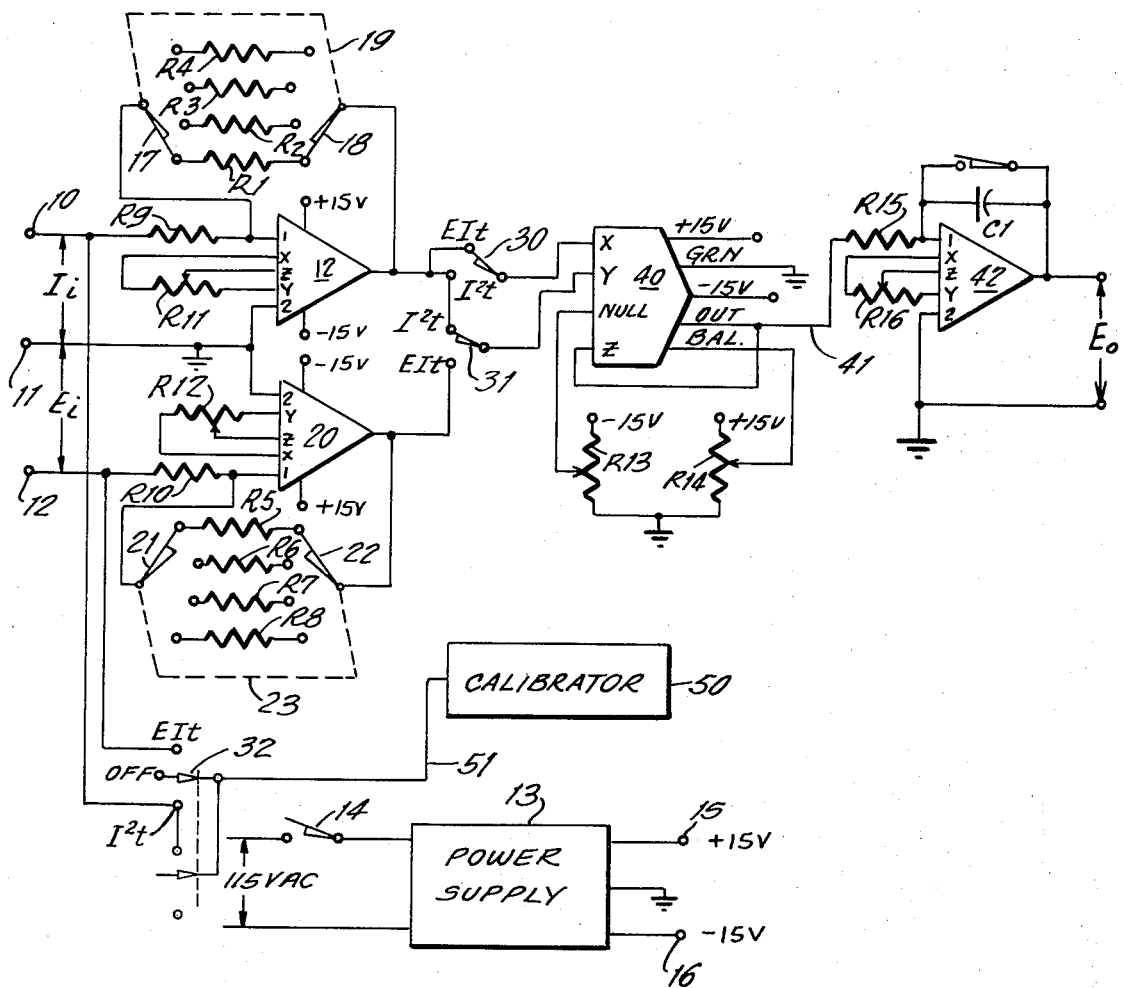

3,706,033
INSTRUMENT FOR MEASUREMENT OF ENERGY OF AN INTERRUPTING DEVICE
Ruben D. Garzon, Malvern, Pa., assignor to I-T-E Imperial Corporation, Philadelphia, Pa.
Filed Sept. 27, 1971, Ser. No. 184,061
Int. Cl. G01r 7/00; H01h 71/04, 85/30
U.S. Cl. 324—140 R          6 Claims

ABSTRACT OF THE DISCLOSURE

An instrument for measuring the energy across a circuit breaker or fuse during their interruption is indicated by measuring and indicating the product of voltage and current, integrated over a given time for the case of a circuit breaker, and the current squared, integrated over a given time for the case of a fuse. The electronic circuitry for performing these measurements includes a first operational amplifier for receiving input current signals, and a second operational amplifier for receiving input circuit voltages. The outputs of these amplifiers is connected to a multiplier circuit through a switching circuit to cause multiplication of the current signal times itself or of the current signal times the voltage signal. A third operational amplifier connected to perform an integration operation is connected to the output of the multiplier circuit and integrates the multiplier output. The integrated output is then representative of the energy being measured and may be indicated by an indicating instrument.

BACKGROUND OF THE INVENTION

When conducting interrupting tests in a power laboratory to determine the performance of fuses or circuit breakers, it is common practice to monitor the instantaneous currents and voltages appearing during interruption by recording these in an oscillographic instrument. The energy consumed during the interruption operation is then computed with the aid of these oscillographs. Thus, in the case of the circuit breaker operation, the values of voltage and current are scaled from the oscillographs and their instantaneous product is integrated over the interruption interval in order to determine the amount of energy applied to the circuit breaker during the interruption period. In the case of a fuse, the current will be scaled from the oscilloscope and a computation is made of the instantaneous current squared over the time in order to determine the energy applied to the fuse during the interruption period. These computations are understandably time-consuming and may be relatively inaccurate, depending upon the quality of the oscillographs and the ability of the user to accurately estimate the appropriate currents and voltages. Moreover, the test equipment is expensive and must be operated by highly skilled technicians.

BRIEF DESCRIPTION OF THE INVENTION

The present invention provide a novel instrument which is connected to the device being measured, whether a circuit breaker or fuse, and which automatically performs the required multiplication of input signals and integration of these signals over the interruption period to produce an output signal representative of the energy being consumed by the device. Thus, the instrument of the invention operates in one of two modes: the first being a current square detector mode, and the second being an energy detector mode.

In the first mode of operation, an input signal is derived from the apparatus being tested which is representative of the current flowing in the test apparatus. This current signal is then applied to an operational amplifier which delivers two output signals, each representative of the same current, to a multiplier which multiplies these two signals to develop an output which is proportional to the current squared. This signal is then applied, in turn, to an operational amplifier which contains an integrating circuit in its feedback circuit, so that the output of this operational amplifier will be the current squared integrated over the measurement time period and, accordingly, will be representative, for example, of the energy consumed by a fuse during fuse interruption.

Where the device is to be used to measure the energy across a circuit breaker, which energy is the product of voltage, current and time, the voltage across the circuit breaker contacts will be connected to a still further input operational amplifier and the output voltage of this operational amplifier will be multiplied by the current output of the first operational amplifier in the multiplier circuit. The product of voltage and current will then be applied to the output operational amplifier containing the integrating circuit so that its output will be the product of voltage, current and time, thereby being representative of the energy consumed by the circuit breaker during interruption.

BRIEF DESCRIPTION OF THE DRAWING

The drawing shows a circuit diagram of the instrument of the present invention.

DETAILED DESCRIPTION OF THE DRAWING

Referring now to the drawing, there is illustrated instrument input terminals 10, 11 and 12 which are connectable to suitable current and voltage monitors being used in connection with the device under test. By way of example, the test setup may include a current transformer or shunt, which will have an output representative of the current passing through the device under test, with the output of this device being connected to terminals 10 and 11, which are the terminals for the instantaneous current $I_i$ being monitored. Where the device being tested is a circuit breaker, the instantaneous voltage across the co-operating contacts or the circuit breaker terminals, or some voltage representative thereof, is applied between terminals 11 and 12, shown as voltage $E_i$. The current signal $I_i$ is connected to the input terminals 1 and 2 of operational amplifier 12, where terminal 2 is a ground terminal.

A power supply 13 is also shown in connection with the drawing as being derived from a conventional 115 volt A.C. source and having a power switch 14, where the power supply 13 has two output voltages at its output terminals 15 and 16 of +15 and —15 volts relative to ground. The operational amplifier 12 is also shown as having two power supply terminals corresponding to terminals 15 and 16 of the power supply 13, where these are indicated by the notations +15 v. and —15 v., respectively. Where other components in the circuit of the drawing are provided with power supply input terminals, the notations +15 v. and —15 v. are conventionally made.

The X and Y terminals of operational amplifier 12 are then connected in series with adjustable center tap resistor R11, with the adjustable tap of resistor R11 connected to the oerational amplifier terminal Z. The operational amplifier feedback circuit connected between its output terminal 4 and input terminal 1 includes one of resistors R1, R2, R3 or R4, where these resistors will have different values to obtain different scale adjustments for the instrument. The appropriate resistor will be selected by the selector switches 17 and 18 which are ganged together as indicated by the dotted line 19. Note that a current-limiting resistor R9 is connected in the input circuit leading from terminal 10 to operational amplifier terminal 1.

A similar arrangement of operational amplifier and control resistors is also provided for the input voltage signal appearing between terminals 11 and 12. Thus, in the drawing, there is an operational amplifier 20 whose input terminals 1 and 2 are connected to voltage monitoring terminals 12 and 11, respectively, where the terminal 12 is connected in series with current-limiting resistor R10. Also, the terminals X and Y of operational amplifier 20 are connected appropriately to the resistor R12. Calibrating feedback resistors R5, R6, R7 and R8 are controlled by switches 21 and 22, which are ganged together as schematically illustrated by dotted line 23.

Control switches including movable switih arms 30 and 31 are then provided to control the mode of operation of the detector. That is, these switches control whether the detector output will be representative of $I^2t$ or $EIt$. Switches 30 and 31 may be ganged together. A further switch 32 is provided for connecting calibrating signals to the instrument, as will be later described. This switch is in the "off" position during the normal operation of the instrument.

With switches 30 and 31 in their $I^2t$ position, the output signal from operational amplifier 20 is disconnected and the output signal from operational amplifier 12 is connected to both terminal X and terminal Y of the multiplier circuit 40. The multiplier circuit 40, as will be seen more fully hereinafter, multiplies the instantaneous signal magnitude applied to its terminals X and Y and the output signal, which is representative of this product, is connected to output line 41 for further processing. In the above case, the current will be multiplied by itself so that the output signal on line 41 will be the instantaneous current squared.

With the switches 30 and 31 connected to the $EIt$ position, the signal connected to the X terminal of multiplier 40 are such that a current signal from operational amplifier 12 is connected to multiplier 40, terminal X, while the output voltage signal of operational amplifier 20 is connected to the X terminal of multiplier 40. Accordingly, the output signal of multiplier 40 on output conductor 41 will be related to the product of instantaneous voltage and instantaneous current.

The multiplier 40 is a conventional circuit component, and is provided with a null terminal and Z terminal, where the Z terminal is connected to the output line 41, while the null terminal is connected to the adjustable tap of adjustable resistor R13. The balance terminal of multiplier 40 is connected to an adjustable tap of adjustable resistor R14 as shown. The output signal on line 41 is then connected to the input terminal 1 of a third operational amplifier 42 through resistor R15. The amplifier terminals X, Y and Z of operational amplifier 42 are conventionally connected to resistor R16.

The feedback circuit of operational amplifier 42 then includes capacitor C1 which, with resistor R15, cause the amplifier 42 to produce an output signal between output terminal 4 and ground terminal 2 of amplifier 42, which integrates the instantaneous signal appearing at line 41. Thus, the output voltage $Eo$ of operational amplifier 42 will be the instantaneous current squared, integrated over the measuring time $t$ when the device is measuring $I^2t$; or will be the product of instantaneous voltage and instantaneous current integrated over the measuring time $t$, where the device is measuring and indicating $EIt$. The output voltage $Eo$ may be then connected to a suitable display instrument.

The circuit of the drawing further contains a calibrating circuit 50 which has an output calibrating signal appearing on output line 51, which signal is connected either to the $EIt$ terminal of switch 32 or the $I^2t$ terminal of switch 32. When the switch is to be calibrated for the $I^2t$ measurement, it will be apparent that a predetermined output signal generated by calibrator circuit 50 is connected to terminal 10 so that the ultimate output voltage $Eo$ can be appropriately calibrated. Similarly, a measured signal can also be applied to terminal 12 in order to calibrate the entire device for the energy measuring operation of the quantity $EIt$.

The input to the instrument terminals 10, 11 and 12 is obtained from either current transformers or shunts for the current and potential transformers or voltage dividers for the voltage. Proper location of the pickup devices would determine the input duration.

In the case of a fuse, for example, current flow through the fuse will be measured, and, therefore, when the fuse is blown, the current flow would stop and so does the input signal to the instrument.

In the case of a circuit breaker, the controlling parameter is the voltage. Current can be monitored before the interruption takes place, but voltage must be measured across the breaker contacts and, therefore, that signal is zero until actual interruption begins to take place with the parting of the contacts. Thus, the product $EI$ is equal to zero until a voltage appears across the contacts. After interruption takes place, the input current $I$ is equal to zero and the insrument ceases to integrate.

The output terminals of the instrument which produce the voltage $Eo$ can be connected to a high impedance voltmeter. However, a greater amount of information can be gained by connecting the output to an oscilloscope or oscillograph. This permits observation of the instantaneous values of energy rather than only the final value.

A satisfactory circuit carrying out the principles of the present invention has been made, using the following components:

| | |
|---|---|
| R1, R5, R9, R10 | 10KΩ. |
| R2, R6 | 20KΩ. |
| R3, R7 | 40KΩ. |
| R4, R8 | 100KΩ. |
| R11, R12, R16 | 2KΩ Adjustable. |
| R13, R14 | 20KΩ. Adjustable. |
| R15 | 10KΩ. |
| Operational Amplifiers 12, 20 and 42 | Operational Amplifier Burr-Brown 3009/15C. |
| Multiplier 40 | Multiplier, Hybrid Systems Corp., Model 107C. |
| C1 | 0.01 µf 20 v. |
| Power Supply 13 | Phipps Power Supply Model 301. |

Although this invention has been described with respect to its preferred embodiments, it should be understood that many variations and modifications will now be obvioous to those skilled in the art, and, therefore, the scope of this invention is to be limited not by the specific disclosure herein, but only by the appended claims.

The embodiments of the invention in which an exclusive privilege or property is claimed are defined as follows:

1. An instrument for measuring the energy applied to an electrical circuit device; said instrument comprising, in combination:

a first instrument input circuit for receiving a signal representative of the current flowing through said circuit device;

a second instrument input circuit for receiving a signal representative of the voltage across said circuit device;

first and second operational amplifier means each having an input circuit and an output circuit; said first and second operational amplifier input circuits connected respectively to said first and second instrument input circuits;

a multiplier circuit having first and second input circuits and an output terminal; said multiplier circuit producing an output signal on its said output terminal which is related to the instantaneous product of the signals applied to its said first and second input circuits;

a switching circuit means for (a) selectively connecting said output circuits of said first and second operational amplifier means to said first and second input circuits respectively of said multiplier circuits, and (b) selectively connecting said output circuit of said first operational amplifier means to both of said first and second input circuits of said multiplier circuit;

and integration circuit means connected to said output terminal of said multiplier circuit for developing an integrated output signal therefrom related to one of the product of the current squared and time, or the product of current, voltage and time.

2. The instrument of claim 1 wherein said integration circuit means includes a third operational amplifier means having a feedback capacitor connected between its input and output terminals.

3. The instrument of claim 1 which includes calibration circuit means connectable to said first and second instrument input terminals.

4. The instrument of claim 1 wherein said first and second operational amplifier means each include a plurality of resistors in circuit relation therewith, and selector switch means for connecting one of said plurality of resistors in series with their said input circuit.

5. The instrument of claim 2 which includes calibration circuit means connectable to said first and second instrument input terminals.

6. The instrument of claim 5 wherein said first and second operational amplifier means each include a plurality of resistors in circuit relation therewith, and selector switch means for connecting one of said plurality of resistors in series with their said input circuit.

References Cited

UNITED STATES PATENTS

| | | | |
|---|---|---|---|
| 2,288,331 | 6/1942 | Skeats | 324—28 R |
| 3,546,441 | 12/1970 | Brendle | 324—141 |

ALFRED E. SMITH, Primary Examiner

U.S. Cl. X.R.

324—28 R